May 5, 1942. L. E. MOBERLY 2,282,235
HYDROCARBON GAS TREATMENT FOR ELECTROGRAPHITIC MATERIAL
Filed Nov. 23, 1940
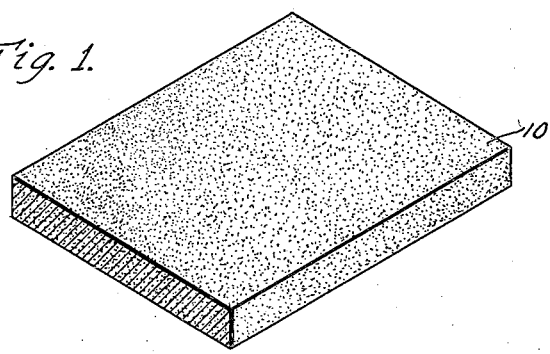
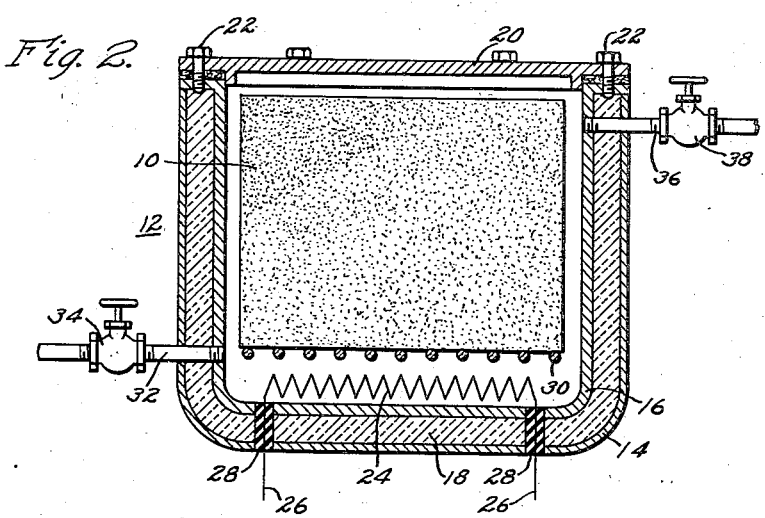
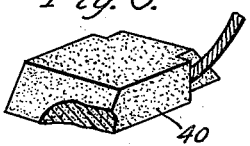
WITNESSES:
INVENTOR
Lawrence E. Moberly.
BY
ATTORNEY Patented May 5, 1942

2,282,235

UNITED STATES PATENT OFFICE 2,282,235

HYDROCARBON GAS TREATMENT FOR ELECTROGRAPHITIC MATERIAL

Lawrence E. Moberly, Wilkinsburg, Pa., assignor to Westinghouse Electric & Manufacturing Company, East Pittsburgh, Pa., a corporation of Pennsylvania Application November 23, 1940, Serial No. 366,924

5 Claims. (Cl. 171—325)

This invention relates to molded carbon bodies, more particularly, carbon brushes and other members suitable for electrical purposes.

In preparing molded carbon members such as brushes by prior art processes for use as electrical contact members, it has been found that the hardness, conductivity and density of the brushes cannot be varied to any great extent for a given process. Electrographitic brushes in particular, since they are subjected to a graphitization treatment at temperatures of the order of 5500° F., at which temperature most impurities will volatilize and escape as gases, have fairly uniform hardness and other characteristics. For some purposes, it is desirable to prepare an electrographitic brush, for example, having a hardness or conductivity greater than that obtainable at present.

The object of this invention is to provide for increasing the hardness density and conductivity of carbon brushes.

A further object of this invention is to provide a heat treatment for carbon brushes in a hydrocarbon atmosphere to improve their physical and electrical properties.

Other objects of this invention will be apparent from the following description and drawings, when taken in conjunction with the appended claims.

Reference should be had to the accompanying drawing, in which:

Figure 1 is a perspective view of a carbon plate;

Fig. 2 is a cross-sectional view of a hydrocarbon gas treatment apparatus; and

Fig. 3 is a perspective view partly in section of a completed carbon brush.

In making carbon bodies such, for example, as carbon brushes the raw materials are lampblack, coke, charcoal, graphite and similar carbonaceous substances mixed in various combinations and proportions. The mixture is combined with a bonding agent such as coal tar, pitches and resins. Slugs formed from the mixture are carbonized or coked by suitable heat treatment and the carbonized slugs are pulverized to a finely divided state. Admixing the pulverized material from slugs with a binder similar to those disclosed above and repulverizing to secure a good mechanical uniformity, the product is known as green carbon flour. This green carbon flour is then formed into a bar or plate under pressures varying from 1,000 to 20,000 pounds per square inch. These bars or plates are carbonized by heat treatment at a carefully controlled temperature cycle to temperatures of about 2200° F. If properly prepared, these plates are suitable for certain applications as brushes and resistance plates in the electrical art after cutting to shape. For some purposes, it is desirable to convert the carbon in the heat-treated plates into the graphitic form. Graphitization is secured by heating the plates at extremely high temperatures of 3,000° F. up to 5500° F. This high temperature treatment will convert as much as 80% of the carbon into the graphite modification. The particular electrical and physical properties such as the porosity, hardness and resistance of the brushes is determined by the heat treatment history.

In some cases it is desirable to secure the benefits produced by a given prior heat treatment and to impart subsequent changes in the conductivity and hardness of the plate. For example, while graphitized brushes have good electrical conductivity, they frequently lack sufficient hardness to maintain the commutators of motors clean whereby the surface resistance between the brush and the commutator reaches high values and excessive sparking and burning takes place. If it were possible to increase the hardness of the carbon brush so that a cleaning action would be exerted by the brush on the moving commutator, this difficulty would not be encountered.

It has been found that the hardness, conductivity and density of porous carbon members may be increased by heat treating the carbon members in a hydrocarbon gas atmosphere at temperatures sufficiently high to insure the cracking of the hydrocarbon gas and a deposition of carbon within the porous carbon members. While the exact nature of the carbonaceous deposit within the carbon members is not known, it is believed that the hydrocarbon gas tends to crack most readily within the interstices of the carbon member and deposits a thin adherent layer of carbon on the minute particles composing the member. The surprising result is that while the density increases with the amount of carbon deposited, the hardness of the material also increases remarkably with small amounts of carbon deposits.

Referring to Fig. 1 of the drawing, the carbon plate 10 molded from green carbon flour and which has been subjected to any of the heat treatments above described ranging from 2200° F. to 5500° F. and resulting in the production of a certain amount of graphitization has a given density, conductivity and hardness. The plate 10 consists mainly of fine particles bonded together with a carbonized binder, and it presents a series of fine pores uniformly dispersed throughout. The density, hardness and conductivity of the plate 10 can be increased by subjecting it to a heat treatment in a controlled hydrocarbon gas atmosphere.

Referring to Fig. 2 of the drawing, there is illustrated an apparatus 12 suitable for carrying out this treatment in which the properties of the block 10 of Fig. 1 may be modified. The apparatus 12 comprises an outer shell 14 and an inner shell 16 with heat insulation 18 therebetween. The shell 16 should preferably be made of some material which is capable of withstanding temperatures of the order of 1,000° C. The carbon plates 10 can be inserted into the container 12 by removing the covering lid 20 which is fastened by means of bolts 22. Suitable temperatures within the container 12 may be secured by means of an electrical heating element 24. The electrical leads 26 to the heating element 24 pass through electrical insulating members 28 capable of withstanding the temperatures produced within the apparatus. As shown, the carbon plates 10 are stood on end on supports 30 of a suitable heat resisting material. Preferably a plurality of plates 10 are heat-treated within the container. In order to secure uniform results the plates 10 should be separated from each other in order that the hydrocarbon gases penetrate uniformly to all portions thereof. The selected hydrocarbon gases are admitted by means of the inlet 32 controlled by valve 34. The gases are exhausted at the outlet 36 controlled by valve 38.

The particular form of the apparatus providing for heat treatment of the plates 10 is not critical. Other shapes and varieties of containers and other modes of heating other than by the use of electrical resistant elements may be employed. It should be noted, however, that in the case where a combustion heater is employed and the products of combustion enter the atmosphere about plates 10 that corresponding changes must be made in the process and the time to compensate for the alteration in the hydrocarbon atmosphere.

The gases which may be employed in providing the atmosphere for the treatment of the carbon plates may consist of any hydrocarbon gas which will crack and deposit carbon within the plates. Suitable gases for this purpose are methane, propane, butane and the like. Natural gas has been made use of and has been satisfactory. In some instances hydrocarbon solids and liquids, such as oils, petroleum, waxes, etc., may be volatilized at the temperatures existing inside the apparatus and may be used for producing the desired gas atmosphere.

It will be appreciated that the various hydrocarbon gases will react at different rates at any given temperature or set of conditions. The selection of the particular gas for the treatment of the carbon plates will depend upon its availability and its cost. As an example of the effect produced by two different gases in which carbon plates were treated under the same conditions of temperature and time, the following table is given.

Table I

| Sample | Before treatment | | After treatment | | |
|---|---|---|---|---|---|
| | Specific resistance | Apparent density | Percent weight increase | Specific resistance | Apparent density |
| GP2 | .0025 | 1.46 | 17.5 | .0016 | 1.67 |
| GA2 | .0023 | 1.48 | 9.2 | .0018 | 1.61 |

Both sets of samples in Table I were heated in a silica tube through which the hydrocarbon gas was passed continuously. The tube was heated rapidly to 600° C. Thereafter the temperature was raised 25° C. per hour up to 950° C. After reaching 950° C., the temperature was held constant for two hours and the samples cooled. Sample GP2 was heated in propane gas while sample GA2 was heated in Pennsylvania natural gas. It will be noted that propane gas gave much greater increase in density than Pennsylvania natural gas for identical time and temperature conditions.

The results obtained by the use of any specific atmosphere depend on the temperature, time and concentration of hydrocarbon constituents in the gas. It has been found that temperatures below 500° C. are rather slow in producing the desired results and that more effective and better controllable results are obtained by operating at temperatures of 600° C. to 1,000° C. and higher. The temperatures may be applied to the plates 10 by a preliminary rapid heating to approximately 600° C. and further heating secured by a slower rate, for example, of the order of 25° C. per hour. This will insure that the carbon plates do not crack due to too great a temperature variation in the plates. During the initial heating of the plates, it may be desirable to flush out oxygen by means of a stream of nitrogen or even the hydrocarbon gas itself. Once reactive temperatures have been reached, the hydrocarbon gas atmosphere may be admitted through the inlet 32. If the carbon plates are to be treated at temperatures of from 950 to 1,000° C., it may be desirable in some cases to reduce the proportion of hydrocarbon gas by admixing a certain quantity of nitrogen. This will provide for closer control of the amount of carbon being deposited within the plate for any given time period.

The following table is illustrative of the changes produced by varying the time of the heat treatment of plates in the same atmosphere and subjected to similar initial conditions.

Table II

| Sample | Before treatment | | After treatment | | |
|---|---|---|---|---|---|
| | Specific resistance | Apparent density | Percent weight increase | Specific resistance | Apparent density |
| (1) | .0026 | 1.45 | 4.8 | .0022 | 1.51 |
| (2) | .0023 | 1.48 | 7.4 | .0019 | 1.57 |

Samples 1 and 2 were prepared by heating the graphitized carbon members rapidly to 600° C. and thereafter the temperature was raised 25° C. per hour up to 950° C. Sample No. 1 was held at 950° C. for one hour while sample No. 2 was heated 950° C. for two hours. The atmosphere in both cases consisted of propane gas.

It will be noted that the increase in weight is not quite proportional to the time of treatment, the deposition of carbon being approximately 50% during the second hour as compared to the deposition during the first hour.

The increase in hardness produced by the heat treatment is difficult to give in terms of such common hardness testing apparatus such as the scleroscope. It has been found that in preparing brushes, such as 40 of Fig. 3, from plates 10 after gas treatment by cutting the plate into desired shapes by means of a carborundum saw that a remarkable difference in hardness becomes quite apparent. While the scleroscope test does indicate a noticeable change in hardness, a more pronounced indication of increase in hardness is revealed upon attempting to sever the plate into brush sized bars and blocks. It has been found that while the plates of Table II before treatment were easily severable by sawing with a resin bonded carborundum saw, the plates 10 after the gas heat treatment were exceedingly hard and were cut with extreme difficulty by the saw.

By varying the length of the gas heat treatment, it is possible to increase the hardness and density of the brushes to any desired degree within a wide range. The specific conductivity will be increased simultaneously therewith. Thus, it will be possible to secure practically any desired condition of hardness and conductivity in a brush. By using untreated brushes having various initial properties, it will be possible to heat-treat the brushes that are low in these characteristics and bring them up to standard or even to bring them up to a physical state that has not been obtainable heretofore.

It is well known that a considerable amount of loss occurs in the brush manufacturing industry due to the fact that many plates after passing through the entire process have excessive resistance or have low hardness which makes them unsuitable for various purposes. It will be possible to eliminate a considerable amount of this wastage by treating the brushes a predetermined length of time in a hydrocarbon gas atmosphere to improve the quality of the brushes.

While the specific details of this disclosure have been drawn to the manufacture of carbon brushes such as are shown in Fig. 3, the gas heat treatment may be employed for other carbonaceous bodies used in the electrical and other industries. For example, graphite crucibles, resistance plates, and similar apparatus may be made much harder and of greater density by such treatment which will make them more suitable for certain purposes.

Furthermore, it is to be understood that the particular form of products shown and described in the particular procedure set forth are presented for purposes of explanation and illustration and that various modifications of such product and procedure can be made without departing from my invention as defined in the appended claims.

I claim as my invention:

1. An electrical contact element comprising a porous block composed of finely divided material consisting mainly of carbon, the pores of the block being partially filled with carbon deposited by the decomposition of a hydrocarbon gas, the deposited carbon increasing the conductivity, the density and the hardness of the porous block.

2. An electrical contact element comprising a porous block composed of finely divided material consisting mainly of carbon, the pores of the block containing carbon deposited during heat treatment of the porous block in a hydrocarbon gas atmosphere, the deposited carbon providing for a predetermined density, hardness and conductivity of the block.

3. An electrographitic brush comprising a porous body produced by graphitizing a molded carbonaceous block, and an addition to the porous body to provide for a predetermined conductivity, hardness and density, the addition comprising carbon deposited in the pores of the body by heat treatment thereof in a hydrocarbon gas atmosphere.

4. An electrographitic brush comprising a porous body produced by graphitizing a molded carbonaceous block, and an addition to the porous body to provide for a predetermined conductivity, hardness and density, the addition comprising carbon deposited in the pores of the body by heat treatment thereof in a natural gas atmosphere.

5. An electrographitic brush comprising a porous body produced by graphitizing molded cabonaceous block, and an addition to the porous body to provide for a predetermined conductivity, hardness and density, the addition comprising carbon deposited in the pores of the body by heat treatment thereof in a propane gas atmosphere.

LAWRENCE E. MOBERLY.